(12) United States Patent
Lin

(10) Patent No.: US 11,647,462 B2
(45) Date of Patent: *May 9, 2023

(54) METHODS FOR COMMUNICATING BANDWIDTH PART DESIGNATIONS IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,536

(22) Filed: Jun. 8, 2021

(65) Prior Publication Data

US 2021/0297951 A1     Sep. 23, 2021

Related U.S. Application Data

(63) Continuation of application No. 16/176,318, filed on Oct. 31, 2018, now Pat. No. 11,064,434.

(60) Provisional application No. 62/579,403, filed on Oct. 31, 2017.

(51) Int. Cl.
*H04W 52/02* (2009.01)

(52) U.S. Cl.
CPC ... *H04W 52/0225* (2013.01); *H04W 52/0206* (2013.01); *H04W 52/0274* (2013.01); *Y02D 30/70* (2020.08)

(58) Field of Classification Search
CPC ......... H04W 52/0225; H04W 52/0206; H04W 52/0274; Y02D 30/70
See application file for complete search history.

(56) References Cited

U.S. PATENT DOCUMENTS 11,064,434 B2 *   7/2021   Lin   ............... H04W 52/0206

* cited by examiner

*Primary Examiner* — Omar J Ghowrwal
(74) *Attorney, Agent, or Firm* — Skaar Ulbrich Macari, P.A.

(57) ABSTRACT

Methods and apparatuses for improving power consumption for an activated cell in a wireless communication system are disclosed herein. In one method, a user equipment (UE) receives a configuration of at least one bandwidth part for a cell. The UE performs a reception for the cell with a bandwidth associated with a first bandwidth part when a first bandwidth part of the cell is active. The UE does not perform the reception for the cell when a second bandwidth part of the cell is active.

20 Claims, 8 Drawing Sheets

FIG. 6 (PRIOR ART)

| | Oct 1 |
|---|---|
| R | |
| $C_1$ | |
| $C_2$ | |
| $C_3$ | |
| $C_4$ | |
| $C_5$ | |
| $C_6$ | |
| $C_7$ | |

FIG. 7 (PRIOR ART)

| | Oct 1 | Oct 2 | Oct 3 | Oct 4 |
|---|---|---|---|---|
| R | | $C_8$ | $C_{16}$ | $C_{24}$ |
| $C_1$ | | $C_9$ | $C_{17}$ | $C_{25}$ |
| $C_2$ | | $C_{10}$ | $C_{18}$ | $C_{26}$ |
| $C_3$ | | $C_{11}$ | $C_{19}$ | $C_{27}$ |
| $C_4$ | | $C_{12}$ | $C_{20}$ | $C_{28}$ |
| $C_5$ | | $C_{13}$ | $C_{21}$ | $C_{29}$ |
| $C_6$ | | $C_{14}$ | $C_{22}$ | $C_{30}$ |
| $C_7$ | | $C_{15}$ | $C_{23}$ | $C_{31}$ |

METHODS FOR COMMUNICATING BANDWIDTH PART DESIGNATIONS IN A WIRELESS COMMUNICATION SYSTEM

CROSS-REFERENCE TO RELATED APPLICATIONS

The present application is a continuation of U.S. patent application Ser. No. 16/176,318, filed Oct. 31, 2018, which claims the benefit of U.S. Provisional Patent Application Ser. No. 62/579,403 filed on Oct. 31, 2017, and the entire disclosures of the foregoing are incorporated herein in their entirety by reference.

FIELD

This disclosure generally relates to wireless communication networks, and more particularly, to a method and apparatus for improving power consumption for an activated cell in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for improving power consumption for an activated cell in a wireless communication system are disclosed herein. In one method, a user equipment (UE) receives a configuration of at least one bandwidth part for a cell. The UE performs a reception for the cell with a bandwidth associated with a first bandwidth part when a first bandwidth part of the cell is active. The UE does not perform the reception for the cell when a second bandwidth part of the cell is active.

BRIEF DESCRIPTION OF THE DRAWINGS

FIG. 6 is a reproduction of FIG. 6.1.3.8-1 taken from 3GPP TS 36.321 V13.1.1 showing Activation/Deactivation MAC control element of one octet.

FIG. 7 is a reproduction of FIG. 6.1.3.8-2: taken from 3GPP TS 36.321 V13.1.1 showing Activation/Deactivation MAC control element of four octets.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), Worldwide Interoperability for Microwave Access (WiMAX™), 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE"; TR 36.211 V13.1.0, "E-UTRA Physical channels and modulation (Release 13)"; TS 36.212 v13.1.0, "Evolved Universal Terrestrial Radio Access (E-UTRA) Multiplexing and channel coding (Release 13)"; TS 36.213 v13.1.1, "E-UTRA Physical layer procedures (Release 13)"; TS 36.331 V14.1.0, "E-UTRA Radio Resource Control (Release 14)"; R4-1610920, "WF on channel bandwidth and transmission bandwidth configuration for NR"; TS 36.133 V14.1.0, "Evolved Universal Terrestrial Radio Access (E-UTRA); Requirements for support of radio resource management"; and TS 36.321 V13.1.1, "Evolved Universal Terrestrial Radio Access (E-UTRA); Medium Access Control (MAC) protocol specification." The standards and documents listed above are hereby expressly incorporated by reference in their entirety.

Figure 1:
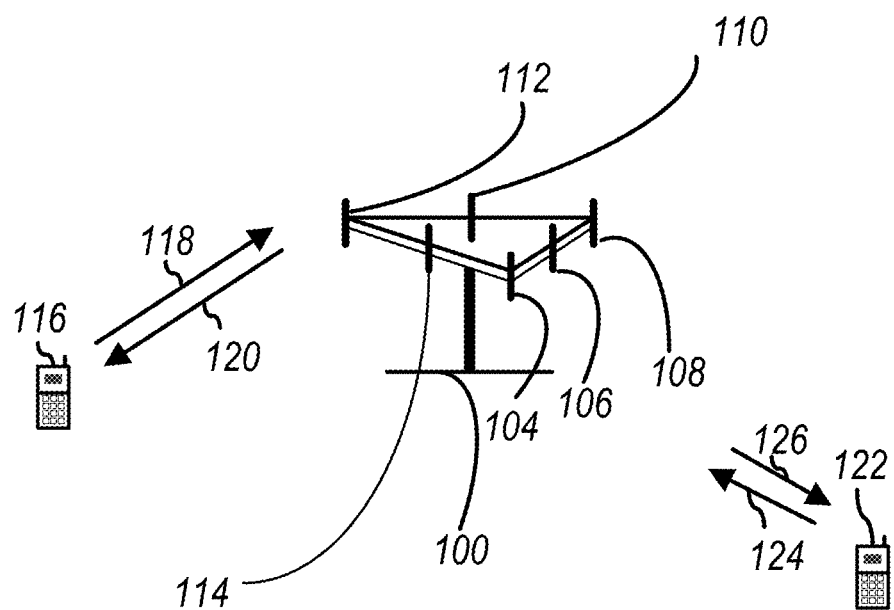
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
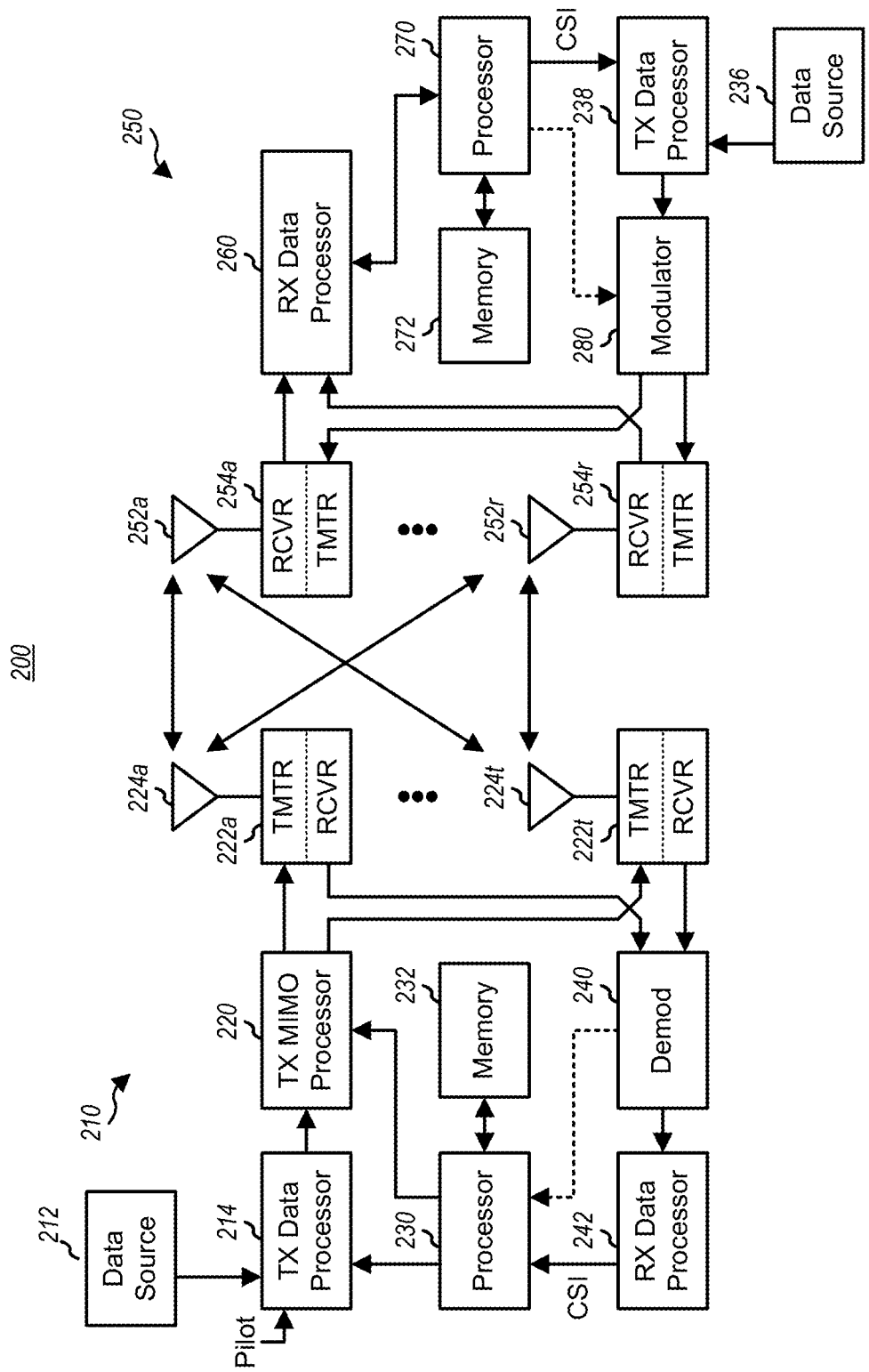
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
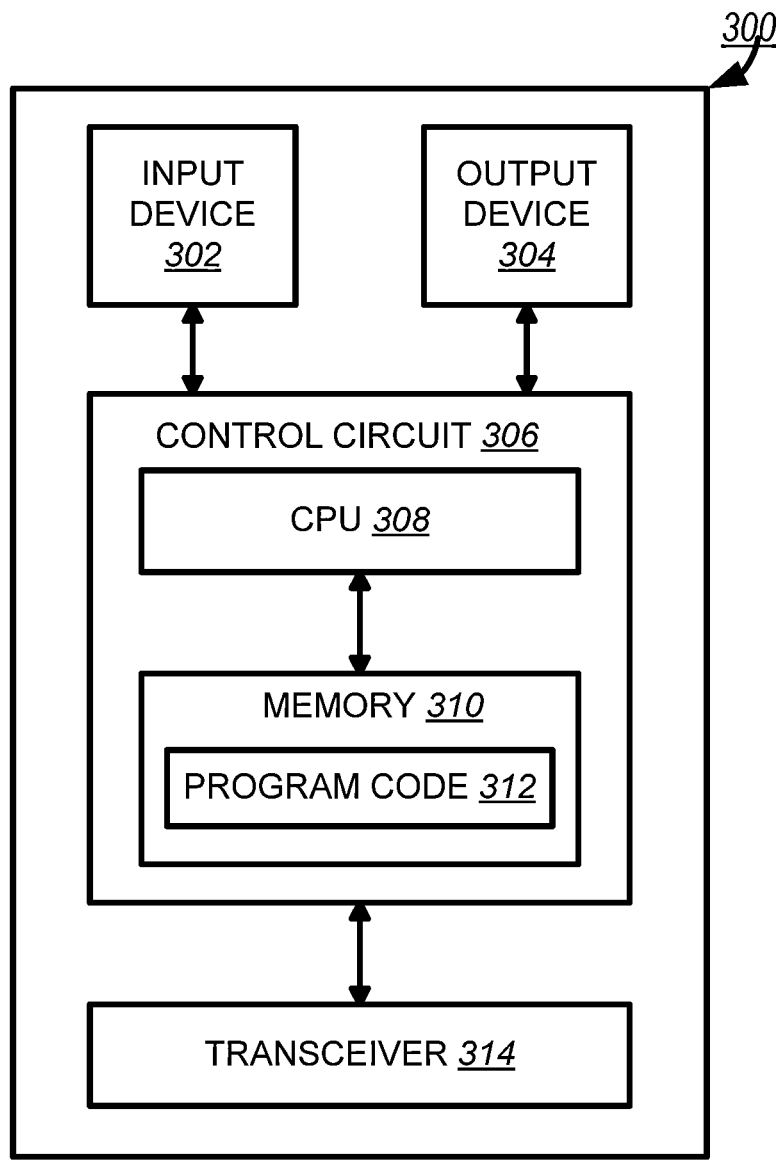
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
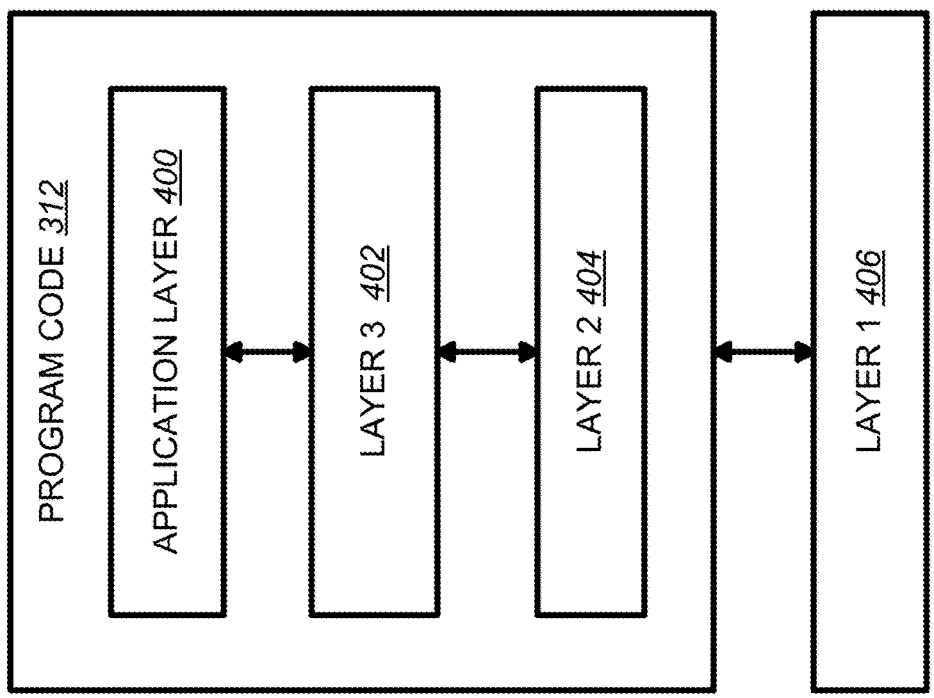
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As discussed in 3GPP RP-150465, frame structure is used in New RAT (NR) for 5G in order to accommodate various type of requirements for time and frequency resources such as ultra-low latency (~0.5 ms) to delay-tolerant traffic for machine-type communications (MTC) and high peak rate for enhanced Mobile Broadband (eMBB) to very low data rate for MTC. A focus of 3GPP RP-150465 is low latency aspect, e.g. short Transmission Time Interval (TTI), while other aspects of mixing/adapting different TTIs was also considered in the study. In addition to diverse services and requirements, forward compatibility is an important consideration in the initial NR frame structure design as not all features of NR would be included in the beginning phase/release.

Numerology can be adjusted so that reducing a symbol number of a TTI would not be the only tool to change TTI length. Using LTE numerology as an example, it comprises 14 OFDM symbol in 1 ms and a subcarrier spacing of 15 KHz. When the subcarrier spacing goes to 30 KHz, under the assumption of same Fast Fourier Transform (FFT) size and same Control Plane (CP) structure, there would be 28 OFDM symbols in 1 ms, equivalently the TTI becomes 0.5 ms if the number of OFDM symbols in a TTI is kept the same. This implies that different TTI lengths can be kept common with good scalability performed on the subcarrier spacing. Of course, there would always be trade-off for the subcarrier spacing selection such as FFT size, definition/number of Physical Resource Blocks (PRBs), the design of CP, or supportable system bandwidth. While NR considers a larger system bandwidth and larger coherence bandwidth, the inclusion of a larger sub carrier spacing is a natural choice.

As mentioned above, it is very difficult to fulfill all the diverse requirements with a single numerology. Therefore, it was agreed by the WI/SI that more than one numerology would be adopted. Considering the standardization and implementation efforts as well as the multiplexing capability among different numerologies, it would be beneficial to have some relationship between different numerologies, such as an integral multiple relationship. Several numerology families were raised—one of which is based on LTE 15 KHz.

Furthermore, the synchronization signal/reference signal design in NR may be quite different from that in LTE. For example, a synchronization signal (e.g., a SS block) periodicity may be 10 or 20 ms as compared with a 5 ms periodicity in LTE. Besides, a base station might adjust the synchronization signal periodicity to a longer value considering all aspects, such as traffic or power consumption, unlike a fixed, assumed periodicity in LTE. Also, CRS(Cell-specific Reference Signal) which is available in every subframe is likely to be removed from NR considering the huge amount of overhead and constant power consumption.

Agreements:
 RAN1 considers following parameter sets with the associated default subcarrier spacing and the possible maximum transmission bandwidth for NR-SS (NR synchronization signal) design
   Parameter set #W associated with 15 kHz subcarrier spacing and NR-SS transmission bandwidth no larger than 5 MHz
   Parameter set #X associated with 30 kHz subcarrier spacing and NR-SS transmission bandwidth no larger than 10 MHz
   Parameter set #Y associated with 120 kHz subcarrier spacing and NR-SS transmission bandwidth no larger than 40 MHz
   Parameter set #Z associated with 240 kHz subcarrier spacing and NR-SS transmission bandwidth no larger than 80 MHz
   Note that association between a frequency band and a single set of the default parameters (SCS, sequence length, NR-SS transmission bandwidth) will be defined in RAN4
   Note that each subcarrier spacing is associated with a single sequence length and a transmission bandwidth
   Note that the additional parameter set or further down selection of the parameter set is not precluded
   This agreement does not preclude any subcarrier spacing for the data channel
Agreements:
 For set of possible SS block time locations, further evaluation until the next meeting by considering at least the following:
   Whether or not a SS block comprises of consecutive symbols and whether or not SS and PBCH (Physical Broadcast channel) are in the same or different slots
   Number of symbols per SS block
   Whether or not to map across slot boundary(ies)
   Whether or not to skip symbol(s) within a slot or a slot set
   Contents of an SS block (note: the contents of an SS block may be further discussed during this meeting)
   How SS blocks are arranged within a burst set, and the number of SS blocks per burst/burst set
Agreements:
 The maximum number of SS-blocks, L, within SS burst set may be carrier frequency dependent
   For frequency range category #A (e.g., 0-6 GHz), the number (L) is TBD within L≤[16]
   For frequency range category #B (e.g., 6-60 GHz), the number is TBD within L≤[128]
   FFS (For Further Study): L for additional frequency range category
 The position(s) of the actual transmitted SS-blocks can be informed for helping CONNECTED/IDLE mode measurement, for helping the CONNECTED mode UE to receive DL data/control in an unused SS-blocks and potentially for helping an IDLE mode UE to receive DL data/control in unused SS-blocks
   FFS whether this information is available only in CONNECTED mode or in both modes
   FFS how to signal the position(s)
Agreements:
 For CONNECTED and IDLE mode UEs, NR should support network indication of SS burst set periodicity and information to derive measurement timing/duration (e.g., time window for NR-SS detection)
   The Network provides one SS burst set periodicity information per frequency carrier to the UE and information to derive measurement timing/duration if possible
     In case that one SS burst set periodicity and one information regarding timing/duration are indicated, the UE assumes the periodicity and timing/duration for all cells on the same carrier
     RAN1 recommends a shorter measurement duration than the configured periodicity e.g., 1, 5 or 10 ms
       Note that L1/L3 filtering across multiple periods is still allowed
     FFS more than one periodicity/timing/duration indication
   If the network does not provide indication of SS burst set periodicity and information to derive measurement timing/duration, the UE should assume 5 ms as the SS burst set periodicity NR should support a set of SS burst set periodicity values for adaptation and network indication Candidate periodicity values to be evaluated are [5, 10, 20, 40, 80 and 160 ms]

To fulfill the requirements of data rate, it is expected that NR needs to support a total bandwidth of above 1 GHz. This may be achieved by aggregating a larger amount of carriers with smaller carrier bandwidth or by aggregating a smaller amount of carriers with larger carrier bandwidth. The tradeoffs between these two options are complexity and efficiency. While NR would support a much wider bandwidth for a single carrier at a level of 100 MHz as compared with a maximum 20 MHz in LTE, this implies that there may be some different design considerations considering such huge difference.

Figure 5:
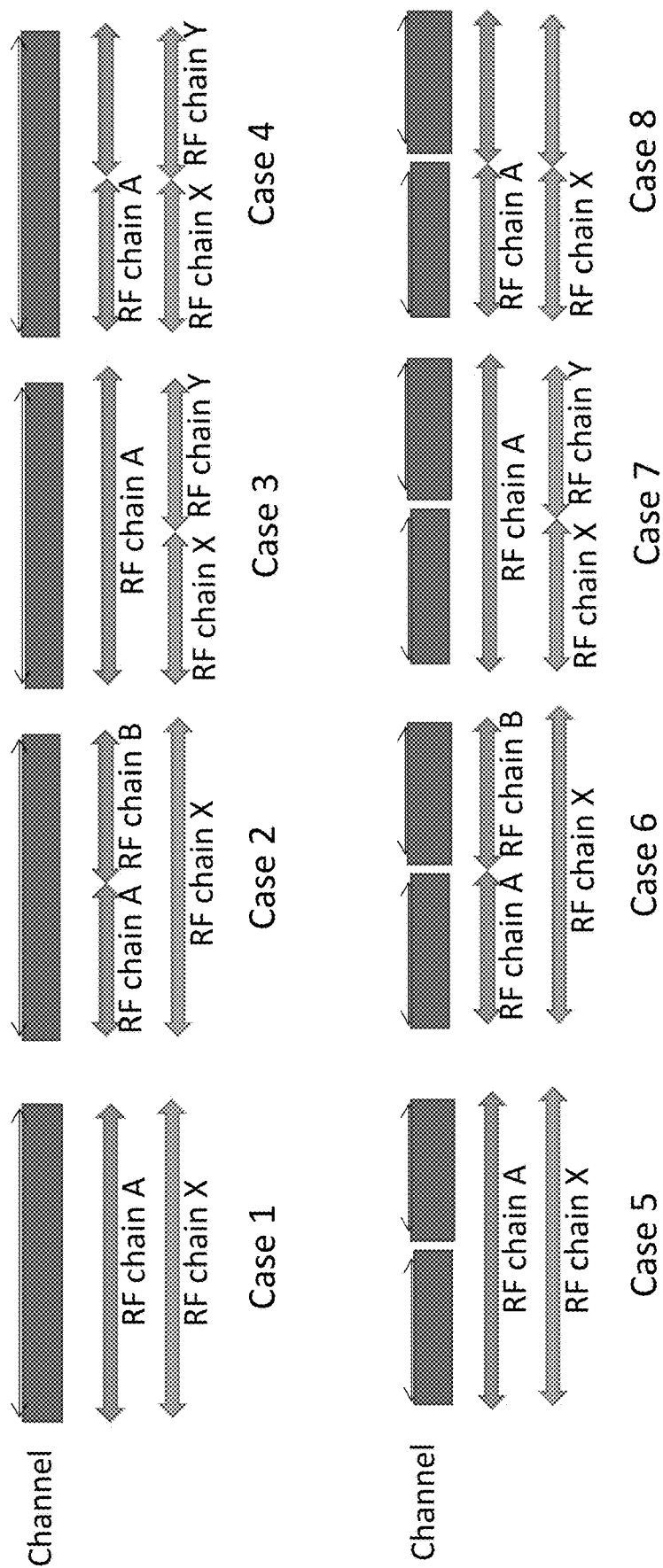
FIG. 5 is a reproduction of FIG. 1 taken 3GPP R4-1610920 showing 8 cases with wide bandwidth and small bandwidth components.

One of the key considerations is whether a single baseband (channel) bandwidth or a single RF bandwidth can cover a single carrier. Many aspects can be considered, such as complexity (e.g., FFT size, sampling rate, PA linearity), or total power, which would result in a different combinations of possible implementations. An example of different options to cover a wider bandwidth with a smaller bandwidth of a component is shown in FIG. 5 (reproduction of FIG. 1 taken from 3GPP R4-1610920).

Another aspect to adopt a concept of bandwidth part is to achieve power saving. A bandwidth part can be (at least) characterized by a bandwidth and a frequency location. A bandwidth and a frequency location of an activated bandwidth part would identify frequency resources where the UE would be expected to receive and/or transmit while outside the frequency resources the UE is not expected to receive and/or transmit. Different bandwidth parts can be activated in different time periods, e.g., subframe/slot/symbol/TTS/mini-slot/radio frame. The power consumption of a reception or a transmission would be highly correlated to a bandwidth used to receive or transmit signal. Although the UE is capable of supporting a larger bandwidth, if there is no data traffic ongoing, e.g. only monitoring control signaling or performing measurement, a bandwidth part with a smaller bandwidth part would be activated. In other words, if the data traffic does not demand much resources, a smaller bandwidth part may be used. Once a larger amount of data is expected or arrives, another bandwidth part with a larger bandwidth would be activated. The power consumption with this bandwidth adaptation would be much less as compared to keeping a larger bandwidth part activated continuously regardless of data traffic conditions.

Some relevant discussions in 3GPP are as follows:
Agreements:
  At least for Phase 1, study mechanisms to support operation over e.g. around 1 GHz contiguous spectrum from both NW and UE perspectives including the maximum single carrier bandwidth of at least 80 MHz
    Carrier Aggregation/Dual Connectivity (Multi-carrier approach)
      Details are FFS
      FFS: non-contiguous spectrum case
    Single carrier operation
      Details are FFS
      Maximum channel bandwidth continues to be studied in RAN1/4
        Maximum bandwidth supported by some UE capabilities/categories may be less than channel bandwidth of serving single carrier
        Note that some UE capabilities/categories may support channel bandwidth of serving single carrier
    Send an LS to ask RAN4 to study the feasibilities of mechanisms above from both NW and UE perspectives
Agreements:
  Study at least the following aspects for NR carrier aggregation/dual connectivity
    Intra-TRP and inter-TRP with ideal and non-ideal backhaul scenarios
    Number of carriers
    The need for certain channels, e.g. downlink control channel, uplink control channel or PBCH for some carriers
    Cross-carrier scheduling and joint UCI feedback, e.g. HARQ-ACK feedback
    TB mapping, i.e., per carrier or across carriers
    Carrier on/off switching mechanism
    Power control
    Different numerologies between different/same carrier(s) for a given UE
      FFS: whether/if different numerologies are multiplexed on one carrier for one UE is called carrier aggregation/dual connectivity
Agreements:
  NR should provide support for carrier aggregation, including different carriers having same or different numerologies.
Agreements:
  For phase 1, carrier aggregation/dual connectivity operation within NR carriers over e.g. around 1 GHz contiguous and non-contiguous spectrum from both NW and UE perspectives is supported
    [4-32] should be assumed for further study of the maximum number of NR carriers
      RAN1 will try to decide the exact number in this week
    Cross-carrier scheduling and joint UCI feedback are supported
    Per-carrier TB mapping is supported
      FFS TB mapping across multiple carriers
Agreements:
  From RAN1 specification perspective, maximum channel bandwidth per NR carrier is [400, 800, 1000] MHz in Release-15
    RAN1 recommends RAN4 to consider at least 100 MHz maximum channel bandwidth per NR carrier in Release-15 considering carrier frequency bands
      RAN1 asks the feasibility of at least followings
        For sub-6 GHz, 100 MHz is considered and for above-6 GHz, wider than 100 MHz is considered
        Other cases can be considered by RAN4, e.g., 40 MHz, 200 MHz
    Note that RAN1 will specify all details for channel bandwidth at least up to 100 MHz per NR carrier in Rel-15
    Also note that RAN1 will consider scalable design(s) for up to maximum channel bandwidth per NR carrier
  From RAN1 specification perspective, the maximum number of NR carriers for CA and DC is [8, 16, 32]
  The maximum FFT size is not larger than [8192, 4096, 2048]

Agreements:
  If it is decided that maximum CC BW is greater than or equal to 400 MHz and smaller than or equal to 1000 MHz
    The maximum number of CCs in any aggregation is [either 8 or 16]
  If it is decided that the maximum CC BW is <=100 MHz
    The maximum number of CCs in any aggregation could be [either 16 or 32]
  If it is decided that the maximum CC BW is greater than 100 MHz and smaller than 400 MHz
    The maximum number of CCs is FFS
Agreements:
  From RAN1 specification perspective, maximum channel bandwidth per NR carrier is 400 MHz in Rel-15
    Note: final decision on the value is up to RAN4
  From RAN1 specification perspective, at least for single numerology case, candidates of the maximum number of subcarriers per NR carrier is 3300 or 6600 in Rel-15
    FFS: For mixed numerology case, the above applies to the lowest subcarrier spacing
    Note: final value for a given channel BW is up to RAN4 decision
  From RAN1 specification perspective, the maximum number of NR carriers for CA and DC is 16
    Note that 32 is considered from RAN2 specification perspective
    The number of NR CCs in any aggregation is independently configured for downlink and uplink
  NR channel designs should consider potential future extension of the above parameters in later releases, allowing Rel-15 UE to have access to NR network on the same frequency band in later releases
Agreements:
  Prepare draft LS in R1-1703919—Peter (Qualcomm) to RAN4 to inform that RAN1 is discussing following alternatives for a wider BW CC, i.e., CC BW greater than X (e.g., 100 MHz),
    A) UE is configured with one wideband carrier while the UE utilizes multiple Rx/Tx chains (Case 3)
    B) A gNB can operate simultaneously as wideband CC for some UEs (UEs with single chain) and as a set of intra-band contiguous CCs with CA for other UEs (UEs with multiple chains)
      FFS: Potential impact on design for the wide BW signal/channels
  Note: The support of multiple Rx/Tx chains in the gNB within one wideband CC is not addressed in above discussion
Agreements:
  Resource allocation for data transmission for a UE not capable of supporting the carrier bandwidth can be derived based on a two-step frequency-domain assignment process
    $1^{st}$ step: indication of a bandwidth part
    $2^{nd}$ step: indication of the PRBs within the bandwidth part
    FFS definitions of bandwidth part
    FFS signaling details
  FFS the case of a UE capable of supporting the carrier bandwidth
  In the following, we provide our view on the details of two step resource allocation for data channel in NR.
Agreements:
  The duration of a data transmission in a data channel can be semi-statically configured and/or dynamically indicated in the PDCCH scheduling the data transmission
    FFS: the starting/ending position of the data transmission
    FFS: the indicated duration is the number of symbols
    FFS: the indicated duration is the number of slots
    FFS: the indicated duration is the numbers of symbols+ slots
    FFS: in case cross-slot scheduling is used
    FFS: in case slot aggregation is used
    FFS: rate-matching details
    FFS: whether/how to specify UE behavior when the duration of a data transmission in a data channel for the UE is unknown
Agreement:
  For single-carrier operation,
    UE is not required to receive any DL signals outside a frequency range A which is configured to the UE
      The interruption time needed for frequency range change from frequency range A to a frequency range B is TBD
      Frequency ranges A & B may be different in BW and center frequency in a single carrier operation
Working assumption:
  One or multiple bandwidth part configurations for each component carrier can be semi-statically signalled to a UE
    A bandwidth part consists of a group of contiguous PRBs
      Reserved resources can be configured within the bandwidth part
    The bandwidth of a bandwidth part equals to or is smaller than the maximal bandwidth capability supported by a UE
    The bandwidth of a bandwidth part is at least as large as the SS block bandwidth
      The bandwidth part may or may not contain the SS block
    Configuration of a bandwidth part may include the following properties
      Numerology
      Frequency location (e.g. center frequency)
      Bandwidth (e.g. number of PRBs)
    Note that it is for RRC connected mode UE
    FFS how to indicate to the UE which bandwidth part configuration (if multiple) should be assumed for resource allocation at a given time
    FFS neighbour cell RR
Agreement:
  Support the following:
    A gNB can operate simultaneously as wideband CC for some UEs and as a set of intra-band contiguous CCs with CA for other UEs
      RAN1 believes that it is beneficial to allow zero guardband between CCs within wideband CC and asks RAN4 to take it into account when discussing channel raster
        If there are scenarios where guard band is considered necessary, strive to minimize the number of subcarriers for guard-band between CCs within wideband CC
        It is RAN1 understanding that guard band might be supported by RAN4
      Allow single or multiple Sync signal locations in wideband CC
    Consider further impact on design for:
      Reference signals
      Resource Block Group design and CSI subbands Agreements:
Confirm the WA of RAN1 #88bis.
Each bandwidth part is associated with a specific numerology (sub-carrier spacing, CP type)
    FFS: slot duration indication if RAN1 decides to not to downselect between 7 symbol and 14 symbols for NR slot duration
UE expects at least one DL bandwidth part and one UL bandwidth part being active among the set of configured bandwidth parts for a given time instant.
    A UE is only assumed to receive/transmit within active DL/UL bandwidth part(s) using the associated numerology
        At least PDSCH and/or PDCCH for DL and PUCCH and/or PUSCH for UL
            FFS: down selection of combinations
    FFS if multiple bandwidth parts with same or different numerologies can be active for a UE simultaneously
        It does not imply that it is required for UE to support different numerologies at the same instance.
            FFS: TB to bandwidth part mapping
    The active DL/UL bandwidth part is not assumed to span a frequency range larger than the DL/UL bandwidth capability of the UE in a component carrier.
Specify necessary mechanism to enable UE RF retuning for bandwidth part switching
Agreements:
Same PRB grid structure for a given numerology is assumed for narrow band UEs, CA UEs and wideband UEs within a wideband NR carrier
    FFS: PRB indexing
Agreement:
For FDD, separate sets of bandwidth part (BWP) configurations for DL & UL per component carrier
    The numerology of DL BWP configuration is applied to at least PDCCH, PDSCH & corresponding DMRS
    The numerology of UL BWP configuration is applied to at least PUCCH, PUSCH & corresponding DMRS
For TDD, separate sets of BWP configurations for DL & UL per component carrier
    The numerology of DL BWP configuration is applied to at least PDCCH, PDSCH & corresponding DMRS
    The numerology of UL BWP configuration is applied to at least PUCCH, PUSCH & corresponding DMRS
    For UE, if different active DL and UL BWPs are configured, UE is not expected to retune the center frequency of channel BW between DL and UL
Agreement:
At least one of configured DL BWPs includes one CORESET with common search space at least in primary component carrier
Each configured DL BWP includes at least one CORESET with UE-specific search space for the case of single active BWP at a given time
    In case of single active BWP at a given time, if active DL BWP does not include common search space, then UE is not required to monitor the common search space
Agreement:
In configuration of a BWP,
    A UE is configured with BWP in terms of PRBs.
        The offset between BWP and a reference point is implicitly or explicitly indicated to UE.
            FFS for reference point, e.g., center/boundary of NR carrier, channel number used for sync. and/or channel raster, or center/boundary of RMSI BW, center/boundary of SS block accessed during the initial access, etc.
    NR supports MU-MIMO between UEs in different (but overlapping) BWPs
Agreements:
Common PRB indexing is supported
    The indexing is common to all the UEs sharing a wideband CC from network perspective, regardless of whether they are NB, CA, or WB UEs.
    The indexing is with respect to the reference point
    The indexing is with respect to a given numerology
    Note: Example usage of common PRB indexing is for scheduling group common PDSCH, RS sequences, BWP configuration, etc.
UE-specific PRB indexing is supported
    It is indexed per BWP with respect to the configured SCS for the BWP
    Note: Example usage of UE-specific indexing is for scheduling UE-specific PDSCH
Agreements:
Activation/deactivation of DL and UL bandwidth parts can be
    by means of dedicated RRC signaling
        Possibility to activate in the bandwidth part configuration
    by means of DCI (explicitly and/or implicitly) or MAC CE [one to be selected]
        by means of DCI could mean
            Explicit: Indication in DCI (FFS: scheduling assignment/grant or a separate DCI) triggers activation/deactivation
                Separate DCI means DCI not carrying scheduling assignment/grant
            Implicit: Presence of DCI (scheduling assignment/grant) in itself triggers activation/deactivation
            This does not imply that all these alternatives are to be supported.
    FFS: by means of timer
    FFS: according to configured time pattern
Agreements:
Common PRB indexing is used at least for DL BWP configuration in RRC connected state
    The reference point is PRB 0, which is common to all the UEs sharing a wideband CC from network perspective, regardless of whether they are NB, CA, or WB UEs.
    An offset from PRB 0 to the lowest PRB of the SS block accessed by the UE is configured by high layer signaling
        FFS the configuration is by RMSI and/or UE-specific signaling
    The common PRB indexing is for maximum number of PRBs for a given numerology defined in Table 4.3.2-1 in 38.211
FFS: common PRB indexing for RS generation for UE-specific PDSCH
FFS: common PRB indexing for UL
Agreements:
There is an initial active DL/UL bandwidth part pair to be valid for a UE until the UE is explicitly (re)configured with bandwidth part(s) during or after RRC connection is established
    The initial active DL/UL bandwidth part is confined within the UE minimum bandwidth for the given frequency band
    FFS: details of initial active DL/UL bandwidth part are discussed in initial access agenda Support activation/deactivation of DL and UL bandwidth part by explicit indication at least in (FFS: scheduling) DCI
  FFS: In addition, MAC CE based approach is supported
Support activation/deactivation of DL bandwidth part by means of timer for a UE to switch its active DL bandwidth part to a default DL bandwidth part
  The default DL bandwidth part can be the initial active DL bandwidth part defined above
  FFS: The default DL bandwidth part can be reconfigured by the network
  FFS: detailed mechanism of timer-based solution (e.g. introducing a new timer or reusing DRX timer)
  FFS: other conditions to switch to default DL bandwidth part
Agreements:
  In Rel-15, for a UE, there is at most one active DL BWP and at most one active UL BWP at a given time for a serving cell
Agreements:
  For each UE-specific serving cell, one or more DL BWPs and one or more UL BWPs can be configured by dedicated RRC for a UE
  FFS association of DL BWP and UL BWP
  FFS definition of an active cell in relation to DL BWP and UL BWP, whether or not there are cross-cell/cross-BWP interactions
Agreements:
  NR supports the case that a single scheduling DCI can switch the UE's active BWP from one to another (of the same link direction) within a given serving cell
  FFS whether & how for active BWP switching only without scheduling (including the case of UL scheduling without UL-SCH)
Agreements:
  Maximum number of HARQ processes for unicast PDSCH is configured per cell for a UE
  FFS impact on DCI design
Agreements:
  For NR CA:
    If CIF is present in DCI, the bitwidth is fixed at 3 bit
      Note: BWP index (if available) is always a separate information field
      FFS detailed conditions for CIF presence
Working assumption:
  In case of cross-carrier scheduling, UESS search spaces for the scheduling cell and for the scheduled cell(s) are separated by offset(s) if they are in the same CORESET
  The offset(s) depends on CIF
  FFS details
  FFS the case of same DCI size (whether to have shared search space or not)
Agreements:
  For paired spectrum, DL and UL BWPs are configured separately and independently in Rel-15 for each UE-specific serving cell for a UE
    For active BWP switching using at least scheduling DCI, DCI for DL is used for DL active BWP switching and DCI for UL is used for UL active BWP switching
      FFS whether or not to support a single DCI switching DL and UL BWP jointly
  For unpaired spectrum, a DL BWP and an UL BWP are jointly configured as a pair, with the restriction that the DL and UL BWPs of such a DL/UL BWP pair share the same centre frequency but may be of different bandwidths in Rel-15 for each UE-specific serving cell for a UE
    For active BWP switching using at least scheduling DCI, DCI for either DL or UL can be used for active BWP switching from one DL/UL BWP pair to another pair
    Note: there is no additional restriction on DL BWP and UL BWP pairing
    Note: this applies to at least the case where both DL & UL are activated to a UE in the corresponding unpaired spectrum
Agreements:
  For a UE, a configured DL (or UL) BWP may overlap in frequency domain with another configured DL (or UL) BWP in a serving cell
Agreements:
  For paired spectrum, support a dedicated timer for timer-based active DL BWP switching to the default DL BWP
    A UE starts the timer when it switches its active DL BWP to a DL BWP other than the default DL BWP
    A UE restarts the timer to the initial value when it successfully decodes a DCI to schedule PDSCH(s) in its active DL BWP
    FFS other cases
    A UE switches its active DL BWP to the default DL BWP when the timer expires
    FFS other conditions (e.g. interaction with DRX timer)
  For unpaired spectrum, support a dedicated timer for timer-based active DL/UL BWP pair switching to the default DL/UL BWP pair
    A UE starts the timer when it switches its active DL/UL BWP pair to a DL/UL BWP pair other than the default DL/UL BWP pair
    A UE restarts the timer to the initial value when it successfully decodes a DCI to schedule PDSCH(s) in its active DL/UL BWP pair
    FFS other cases
    A UE switches its active DL/UL BWP pair to the default DL/UL BWP pair when the timer expires
    FFS other conditions (e.g. interaction with DRX timer)
  FFS the range and granularity of the timer
Agreements:
  For an Scell, a UE can be configured with the following:
    a timer for timer-based active DL BWP (or DL/UL BWP pair) switching, along with a default DL BWP (or the default DL/UL BWP pair) which is used when the timer is expired
      The default DL BWP can be different from the first active DL BWP
  For Pcell, the default DL BWP (or DL/UL BWP pair) can be configured/reconfigured to a UE
    If no default DL BWP is configured, the default DL BWP is the initial active DL BWP
Agreements:
  In a serving cell where PUCCH is configured, each configured UL BWP includes PUCCH resources
Agreements:
  A DL (or UL) BWP is configured to a UE by resource allocation Type 1 with granularity as follows
    Granularity of starting frequency location: 1 PRB
    Granularity of bandwidth size: 1 PRB
    Note: The above granularity doesn't imply that a UE shall adapt its RF channel bandwidth accordingly Agreements:
  For a UE, DCI format size itself is not part of RRC configuration irrespective of BWP activation & deactivation in a serving cell
    Note: DCI format size may still depend on different operations and/or configurations (if any) of different information fields in the DCI In LTE, carrier aggregation is one way to grab more bandwidth for downlink/uplink (DL/UL) transmissions without increasing the bandwidth of a single cell. Initially in Release-10, up to 5 cells can be aggregated for a UE, which translates to approximately 100 MHz bandwidth in total. Up to 32 cells can be aggregated to accommodate more demand during peak data rate as well as more of the potential spectrum can be utilized, e.g., un-licensed band. The Radio Resource Control (RRC) can firstly configure/add several SCells (secondary cell) for a UE. Depending on traffic demands of the UE, the SCell can be activated and/or deactivated. For example, when more traffic is coming for a UE, one or multiple SCell can be activated for a higher data rate. When there is no or low traffic, the SCell(s) can be deactivated to reduce the power consumption. The activation and/or deactivation of the SCell(s) can be done via a Medium Access Control (MAC) control element (MAC CE). A bit map is carrier in the MAC CE to inform a UE which SCell is activated/deactivated. SCell activation and/or deactivation may involve some hardware adaptation and some initial measurements; thus, there may be some delay between the receipt of a subframe activation command and the application of the subframe activation command (e.g., when the SCell is ready to perform transmission). In LTE, the delay may depend on the UE capability, and the delay may be up to 24 ms. More details are discussed in 3GPP TS 36.213 v13.1.1, TS 36.133 V14.1.0, and TS 36.321 V13.1.1.

Specifically, 3GPP TS 36.212 v13.1.0 provides:
4.3 Timing for Secondary Cell Activation/Deactivation
When a UE receives an activation command [8] for a secondary cell in subframe n, the corresponding actions in [8] shall be applied no later than the minimum requirement defined in [10] and no earlier than subframe n+8, except for the following:
  the actions related to CSI reporting
  the actions related to the sCellDeactivationTimer associated with the secondary cell [8] which shall be applied in subframe n+8.
When a UE receives a deactivation command [8] for a secondary cell or the sCellDeactivationTimer associated with the secondary cell expires in subframe n, the corresponding actions in [8] shall apply no later than the minimum requirement defined in [10], except for the actions related to CSI reporting which shall be applied in subframe n+8.

Specifically, 3GPP TS 36.133 V14.1.0 provides:
7.7.2 SCell Activation Delay Requirement for Deactivated SCell
The requirements in this section shall apply for the UE configured with one downlink SCell. The requirements in this section are applicable for E-UTRA FDD, E-UTRA TDD and E-UTRA TDD-FDD carrier aggregation.
The delay within which the UE shall be able to activate the deactivated SCell depends upon the specified conditions.
Upon receiving SCell activation command in subframe n, the UE shall be capable to transmit valid CSI report and apply actions related to the activation command as specified in [17] for the SCell being activated no later than in subframe n+24 provided the following conditions are met for the SCell:

During the period equal to max(5 measCycleSCell, 5 DRX cycles) before the reception of the SCell activation command:
  the UE has sent a valid measurement report for the SCell being activated and
  the SCell being activated remains detectable according to the cell identification conditions specified in section 8.3.3.2,
SCell being activated also remains detectable during the SCell activation delay according to the cell identification conditions specified in section 8.3.3.2.

Otherwise upon receiving the SCell activation command in subframe n, the UE shall be capable to transmit valid CSI report and apply actions related to the activation command as specified in [17] for the SCell being activated no later than in subframe n+34 provided the SCell can be successfully detected on the first attempt.

If there is no reference signal received for the CSI measurement over the delay corresponding to the minimum requirements specified above, then the UE shall report corresponding valid CSI for the activated SCell on the next available uplink reporting resource after receiving the reference signal.

If there are no uplink resources for reporting the valid CSI in subframe n+24 or n+34 then the UE shall use the next available uplink resource for reporting the corresponding valid CSI.

The valid CSI is based on the UE measurement and corresponds to any CQI value specified in [3] with the exception of CQI index=0 (out of range) provided:
  the conditions in section 7.7 are met over the entire SCell activation delay and
  the conditions for CQI reporting defined in Section 7.2.3 of [3] are met.

In addition to CSI reporting defined above, UE shall also apply other actions related to the activation command specified in [17] for an SCell at the first opportunities for the corresponding actions once the SCell is activated.

The PCell interruption specified in section 7.8.2 shall not occur before subframe n+5 and not occur after subframe n+9 when PCell belongs to E-UTRA FDD.

The PCell interruption specified in section 7.8.2 shall not occur before subframe n+5 and not occur after subframe n+11 when PCell belongs to E-UTRA TDD.

Starting from the subframe specified in section 4.3 of [3] and until the UE has completed the SCell activation, the UE shall report CQI index=0 (out of range) if the UE has available uplink resources to report CQI for the SCell.

7.7.3 SCell Deactivation Delay Requirement for Activated SCell
The requirements in this section shall apply for the UE configured with one downlink SCell. The requirements in this section are applicable for E-UTRA FDD, E-UTRA TDD and E-UTRA TDD-FDD carrier aggregation.
Upon receiving SCell deactivation command or upon expiry of the sCellDeactivationTimer in subframe n, the UE shall accomplish the deactivation actions specified in [17] for the SCell being deactivated no later than in subframe n+8.
The PCell interruption specified in section 7.8.2 shall not occur before subframe n+5 and not occur after subframe n+9 when PCell belongs to E-UTRA FDD.
The PCell interruption specified in section 7.8.2 shall not occur before subframe n+5 and not occur after subframe n+11 when PCell belongs to E-UTRA TDD.

Specifically, 3GPP TS 36.321 V13.1.1 provides:

5.13 Activation/Deactivation of SCells

If the MAC entity is configured with one or more SCells, the network may activate and deactivate the configured SCells. The SpCell is always activated. The network activates and deactivates the SCell(s) by sending the Activation/Deactivation MAC control element described in subclause 6.1.3.8. Furthermore, the MAC entity maintains a sCellDeactivationTimer timer per configured SCell (except the SCell configured with PUCCH, if any) and deactivates the associated SCell upon its expiry. The same initial timer value applies to each instance of the sCellDeactivationTimer and it is configured by RRC. The configured SCells are initially deactivated upon addition and after a handover. The configured SCG SCells are initially deactivated after a SCG change.

The MAC entity shall for each TTI and for each configured SCell:

if the MAC entity receives an Activation/Deactivation MAC control element in this TTI activating the SCell, the MAC entity shall in the TTI according to the timing defined in [2]:

activate the SCell; i.e. apply normal SCell operation including:
  SRS transmissions on the SCell;
  CQI/PMI/RI/PTI/CRI reporting for the SCell;
  PDCCH monitoring on the SCell;
  PDCCH monitoring for the SCell;
  PUCCH transmissions on the SCell, if configured.
start or restart the sCellDeactivationTimer associated with the SCell;
trigger PHR according to subclause 5.4.6.

else, if the MAC entity receives an Activation/Deactivation MAC control element in this TTI deactivating the SCell; or if the sCellDeactivationTimer associated with the activated SCell expires in this TTI:
  in the TTI according to the timing defined in [2]:
    deactivate the SCell;
    stop the sCellDeactivationTimer associated with the SCell;
    flush all HARQ buffers associated with the SCell.

if PDCCH on the activated SCell indicates an uplink grant or downlink assignment; or if PDCCH on the Serving Cell scheduling the activated SCell indicates an uplink grant or a downlink assignment for the activated SCell:
  restart the sCellDeactivationTimer associated with the SCell;

if the SCell is deactivated:
  not transmit SRS on the SCell;
  not report CQI/PMI/RI/PTI/CRI for the SCell;
  not transmit on UL-SCH on the SCell;
  not transmit on RACH on the SCell;
  not monitor the PDCCH on the SCell;
  not monitor the PDCCH for the SCell;
  not transmit PUCCH on the SCell.

HARQ feedback for the MAC PDU containing Activation/Deactivation MAC control element shall not be impacted by PCell, PSCell and PUCCH SCell interruptions due to SCell activation/deactivation [9].

NOTE: When SCell is deactivated, the ongoing Random Access procedure on the SCell, if any, is aborted.

<...>

6.1.3.8 Activation/Deactivation MAC Control Elements

The Activation/Deactivation MAC control element of one octet is identified by a MAC PDU subheader with LCID as specified in table 6.2.1-1. It has a fixed size and consists of a single octet containing seven C-fields and one R-field. The Activation/Deactivation MAC control element with one octet is defined as follows (FIG. 6.1.3.8-1).

The Activation/Deactivation MAC control element of four octets is identified by a MAC PDU subheader with LCID as specified in table 6.2.1-1. It has a fixed size and consists of a four octets containing 31 C-fields and one R-field. The Activation/Deactivation MAC control element of four octets is defined as follows (FIG. 6.1.3.8-2).

For the case with no serving cell with a ServCellIndex [8] larger than 7, Activation/Deactivation MAC control element of one octet is applied, otherwise Activation/Deactivation MAC control element of four octets is applied.

$C_i$: if there is an SCell configured with SCellIndex i as specified in [8], this field indicates the activation/deactivation status of the SCell with SCellIndex i, else the MAC entity shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;

R: Reserved bit, set to "0".

FIG. 6 (reproduction of FIG. 6.1.3.8-1 taken from 3GPP TS 36.321 V13.1.1)

FIG. 7 (reproduction of FIG. 6.1.3.8-1 taken from 3GPP TS 36.321 V13.1.1)

Carrier aggregation remains as an important feature in NR because it boosts the available bandwidth by increasing the number of aggregated cell(s). Most of the framework built in LTE can be reused to a large extent, for example, configuring a RRC signal first and activating with MAC CE later. The relationship between a cell and a bandwidth part in carrier aggregation is also discussed as follows:

Proposals:
Option #1
  NR supports Scell activation via DCI signaling
    FFS for deactivation
    FFS interactions between Scell deactivation timer and BWP timer
Option #2:
  NR supports Scell activation/deactivation via MAC CE signalling
  Optionally,
    BWP switching DCI to switch bandwidth part can be used to activate Scell
    FFS details
Option #3:
  NR supports Scell activation/deactivation via MAC CE signalling only Agreements:
  For an Scell, RRC signaling for Scell configuration/reconfiguration indicates the first active DL BWP and/or the first active UL BWP when the Scell is activated
    NR supports Scell activation signaling that doesn't contain any information related to the first active DL/UL BWP
  For an Scell, active DL BWP and/or UL BWP are deactivated when the Scell is deactivated
    Note: it's RAN1's understanding that the Scell can be deactivated by an Scell timer As discussed above, bandwidth part adaption and activation/deactivation both can contribute to traffic adaptation and power saving. From the traffic adaptation perspective, bandwidth adaptation appears to be a more attractive tool due to its low latency. For example, a new bandwidth part configuration can be applied ~4 ms after the reception of a bandwidth part activation command as compared to tens of ms delay for activation/deactivation. However, from power saving perspective, deactivating a Secondary Cell (SCell) seems to be a more attractive solution as the whole RF/baseband circuit can be turn off as compared with bandwidth adaptation to a default/smaller bandwidth part. It is expected that a UE would still receive data with a smaller bandwidth according to the default/smaller bandwidth part. Thus, the consumption of power is less due to the shrinkage of bandwidth, but some component of power consumption cannot be removed as the hardware circuit is not completely turned off. A more efficient way to operate with cell activation/deactivation is needed to gain the benefits of bandwidth part adaption and activation/deactivation while avoiding the drawbacks of both methods.

It is also noted that deactivation cannot be applied to a Primary Cell (Pcell), which means the power consumption on the PCell cannot be avoided irrespective of the traffic situation, for example, even if all the on-going traffic is on the SCell(s). A power saving mechanism can be derived for the PCell.

As disclosed herein, a numerology refers to a frequency domain property and/or a time domain property. The frequency domain property is a subcarrier spacing, a subcarrier spacing used for transmission, a reference subcarrier spacing, or a Physical Resource Block (PRB) size (in a frequency domain). The time domain property is a symbol length excluding a cyclic prefix (CP), a symbol length including CP, a slot length, or a PRB size (in the time domain).

As disclosed herein, a data channel refers to a downlink data channel, an uplink data channel, or both an uplink data channel and a downlink data channel unless otherwise specified.

As disclosed herein, a frequency location can refer to a PRB, an index of a PRB, a subcarrier, an index of a subcarrier, a reference point in a frequency domain, or an absolute frequency unless otherwise specified.

As disclosed herein, a frequency location of a bandwidth part can be represented by a center PRB of the bandwidth part, a PRB with the lowest index of the bandwidth part, a PRB with the highest index of the bandwidth part, a PRB with a specific index of the bandwidth part, or a specific PRB of the bandwidth part.

As disclosed herein, for a UE, there is at most one active DL BWP and at most one active UL bandwidth part at a given time for a serving cell unless otherwise specified.

In a first embodiment, a special bandwidth part can be explicitly or implicitly configured for a cell for a UE. When the special bandwidth part is active, the UE would not receive and/or transmit any DL signal for the cell. That is, the UE would act as if, for example, the cell is deactivated.

In a second embodiment, a gNB would send a signal to switch the bandwidth part from a special bandwidth part to an ordinary bandwidth part for a cell. For example, the signal can be used to wake up the cell. More specifically, the UE does not perform any reception when the special bandwidth part is active and performs the reception according to the ordinary bandwidth part when the ordinary bandwidth part is active. In one embodiment, the signal to switch to a special bandwidth is different from the signal to switch among ordinary bandwidth parts. For example, the signal cannot be transmitted on the cell connected to the UE, but it is always transmitted from another cell. In one embodiment, the signal can be a MAC CE for activation and/or deactivation. In an alternate embodiment, the UE switches from an ordinary bandwidth part to a special bandwidth part according to a signal which is the same as a signal to switch among ordinary bandwidth parts.

In a third embodiment, when a special bandwidth part for a cell is active, the cell cannot be deactivated implicitly. For example, when an ordinary bandwidth part for a cell is active, the cell can be deactivated implicitly. However, when a special bandwidth part for the cell is active, the cell cannot be deactivated implicitly. It is noted that a cell being deactivated implicitly means that the UE deactivates the cell after being inactive for a period of time, e.g. upon expiry of a timer. Alternatively, "the cell cannot be deactivated implicitly" can be achieved by setting a corresponding timer to infinity. In another alternative, "the cell cannot be deactivated implicitly" can be achieved by stopping a corresponding timer. In yet another alternative, "the cell cannot be deactivated implicitly" can be achieved by prohibiting the functionality of the implicit deactivation. It is noted that "the cell can be deactivated implicitly" can be achieved, for example, by setting a corresponding timer to a proper value and not stopping the corresponding timer.

In a fourth embodiment, different signals can be used to indicate switch between different types of bandwidth parts, e.g., between ordinary bandwidth parts or between a special and ordinary bandwidth parts.

Any combination of the above three embodiments can be used to form a new method to operate a special bandwidth part. For example, when a special bandwidth part for a first cell is active, the UE would not perform reception on the first cell. If the UE receives a signal on a second cell, the signal from the second cell switches the bandwidth part for the first cell from the special bandwidth part to an ordinary bandwidth part. The UE would resume reception after the switch to the ordinary bandwidth part. In another example, when a special bandwidth part for a first cell is active, the UE would not perform reception on the first cell and also the first cell cannot be deactivated implicitly.

In the above-disclosed embodiments, the cell can be a SCell or a PCell. Alternatively, the cell can only be a SCell. In another alternative, the cell can only be a PCell.

In the above-disclosed embodiments, a special bandwidth part is for DL or UL. Alternatively, the special bandwidth part is for DL and not UL. In yet another alternative, the special bandwidth part is for UL and not DL. In another alternative, the special bandwidth part is for DL and UL.

A special bandwidth part can be a zero bandwidth part, a bandwidth part with zero bandwidth and a frequency location, a bandwidth part with a non-zero bandwidth and without a frequency location, or a bandwidth part with zero bandwidth and without a frequency location.

The ordinary bandwidth part has a frequency location and a non-zero bandwidth.

A UE performs a reception for a cell with a bandwidth associated with an ordinary bandwidth part if the ordinary bandwidth part for the cell is active. The UE does not perform a reception for the cell if a special bandwidth part for the cell is active.

A UE performs a reception with a bandwidth associated with an ordinary bandwidth part if the ordinary bandwidth part for a cell is active. The UE performs one, some, all, or any combination of the following UE action(s)/behavior(s) if a special bandwidth part for the cell is active or activated for the UE:

behave as if the cell was deactivated;
    stop DL reception, e.g. within the frequency range of the cell;
    stop the sCellDeactivationTimer associated with the cell;
    set value the sCellDeactivationTimer associated with the cell to infinity;

prohibit implicit deactivation;
flush all Hybrid Automated Repeat Request (HARQ) buffers associated with the cell;
does not flush all HARQ buffers associated with the cell
stop Physical Downlink Control Channel (PDCCH) monitoring on the cell (unless some other exception specified otherwise);
not monitor PDCCH on the cell (unless some other exception specified otherwise);
stop PDCCH monitoring for the cell (unless some other exception specified otherwise);
not monitor PDCCH for the cell (unless some other exception specified otherwise);
monitor PDCCH for the cell;
no (stop) DL data reception, e.g. on semi-persistent resource;
not preform DL measurement;
stop DL measurement;
perform radio resource management measurement;
perform radio link monitoring measurement;
not report Channel State Information (CSI) for the Cell;
stop reporting CSI for the cell;
report CSI for the cell;
turn off a Radio Frequency (RF) circuit;
turn off baseband circuit;
no (stop) UL transmission, e.g. within the frequency range of the cell;
perform UL transmission, e.g. within the frequency range of the cell;
stop Sounding Reference Signal (SRS) transmission
not transmit SRS;
transmit SRS;
no (stop) UL data transmission, e.g. on semi-persistent resource or for a retransmission;
perform UL data transmission, e.g. on semi-persistent resource or for a retransmission;
stop Physical Uplink Control Channel (PUCCH) transmission;
not transmit PUCCH;
transmit PUCCH;
not perform random access procedure on the cell;
stop random access procedure on the cell;
perform random access on the cell;
not transmit on Random Access Channel (RACH) on the cell;
stop RACH transmission on the cell;
transmit on RACH on the cell;
set reception bandwidth to zero;
set transmission bandwidth to zero; and
switch from self-scheduling to cross-carrier scheduling.

In one embodiment, a gNB configures one or multiple bandwidth part of a UE for a cell. In an alternate embodiment, one of the bandwidth part is a special bandwidth part. In an alternate embodiment, there is at most one special bandwidth part for a cell. In an alternate embodiment, the special bandwidth part is identified by a (specific/special) indication. In an alternate embodiment, the special bandwidth part is identified by an irregular/non-typical configuration (note that irregular/non-typical is in the view point of an ordinary bandwidth part). In an alternate embodiment, the special bandwidth part is identified by a bandwidth for a bandwidth part, e.g. when a bandwidth of bandwidth part fulfills certain criteria, the bandwidth part is a special bandwidth part. In one embodiment, the special bandwidth part is identified by a zero bandwidth. In an alternate embodiment, the special bandwidth part is identified by a bandwidth which is less than X Physical Resource Block (PRB). Preferably, X is a minimum bandwidth for an ordinary bandwidth part. In an alternate embodiment, the special bandwidth part is identified by a bandwidth which is larger than X PRB. In an alternate embodiment, X PRB is a maximum bandwidth of the UE. In an alternate embodiment, X is a maximum bandwidth for a (ordinary) bandwidth part (on the cell). In an alternate embodiment, X is a minimum bandwidth for a control resource set. In one embodiment, X is 6. In an alternate embodiment, the special bandwidth part is identified by a frequency location for a bandwidth part. In an alternate embodiment, the special bandwidth part is identified by a reserved frequency location. In an alternate embodiment, the special bandwidth part is identified by a frequency location which is outside a frequency range of a cell. In another embodiment, the special bandwidth part is identified by a bandwidth part whose resource maps outside a frequency range of the cell. In one embodiment, the special bandwidth part is identified by a reserved value/state of a Resource Indication Value (RIV), e.g. a RIV value with all 1's. In an alternate embodiment, the special bandwidth part is configured for DL. Alternatively, the special bandwidth part is configured for UL. In another embodiment, when a special bandwidth part is active, the UE does not perform any reception. Alternatively, when a special bandwidth part is active, the UE does not perform PDCCH monitoring on the cell. Alternatively, when a special bandwidth part is active, the UE does not perform PDCCH monitoring for the cell. Alternatively, when a special bandwidth part is active, the UE does not perform PDCCH monitoring on/for the cell during an active time. Alternatively, when a special bandwidth part is active, the UE stops all or some of its Discontinuous Reception (DRX) timers associated with the cell. Alternatively, when a special bandwidth part is active, the UE behaves as if the cell is deactivated. Alternatively, when a special bandwidth part is active, the UE does not perform a transmission. Alternatively, when a special bandwidth part is active, the UE perform any of the action(s) listed above. In another embodiment, the gNB sends a signal to activate a special bandwidth part. More specifically, the special bandwidth part is not configured. Alternatively, activation of the special bandwidth part is indicated by a reserved field/state of the signal. Alternatively, activation of the special bandwidth part is indicated by an index which is associated with the special bandwidth part. Alternatively, the association is configured together with a bandwidth part configuration. In one embodiment, the signal is Downlink Control Information (DCI). Alternatively, the signal is used to activate a bandwidth part. Alternatively, the signal is used to switch bandwidth part. In another alternative, the signal is used to switch the bandwidth part from an ordinary bandwidth part to a special bandwidth part. In one alternative, the signal is used to switch the bandwidth part from a special bandwidth part to an ordinary bandwidth part. In another alternative, the signal cannot be used to switch the bandwidth part from a special bandwidth part to an ordinary bandwidth part.

In another embodiment, a gNB sends a first signal for a first cell to activate an ordinary bandwidth part for the cell when a special bandwidth part for the cell is active. Alternatively, the first signal switches bandwidth part for the cell from the special bandwidth part to the ordinary bandwidth part. Alternatively, the first signal would activate a bandwidth part indicated by the first signal. Alternatively, the first signal would activate a predetermined bandwidth part. Alternatively, the first signal would activate an initial active bandwidth part. Alternatively, the first signal would activate a default bandwidth part. Alternatively, the first signal is an activation command of bandwidth part for the first cell. Alternatively, the first signal is the same as a second signal to activate another ordinary bandwidth part when an ordinary bandwidth part is active. Alternatively, the second signal is used to activate a special bandwidth part when an ordinary bandwidth part is active. Alternatively, the first signal is a downlink control information (DCI). Alternatively, the first signal is transmitted on a configured timing occasion, e.g., periodically, when a special bandwidth part is active. Alternatively, the UE monitors the first signal a configured timing occasion when a special bandwidth part is active. More specifically, the UE would resume reception (for PDCCH) in the configured timing occasion(s). Alternatively, the UE monitors the second signal in any time occasion it monitors a (UE-specific) PDCCH when an ordinary bandwidth part is active. Alternatively, the second signal is transmitted on any timing occasions for a UE-monitoring DCI, e.g. during active time, when an ordinary bandwidth part is active. It is notable that the difference induced for transmission/monitoring behavior for the signal is due to the fact that when an ordinary bandwidth part is active, PDCCH monitoring continues and there is no restriction for receiving the signal.

On the other hand, when a special bandwidth part is active, the main purpose is power saving; thus, most of the time for PDCCH monitoring is shut-down on the cell and only available on some occasions, e.g., configured timing occasion(s). Alternatively, the first signal is transmitted on a second cell. Alternatively, the second signal is transmitted on the first cell. Alternatively, the first signal is a cross-carrier scheduling PDCCH for the first cell. Alternatively, the cross-carrier scheduling PDCCH is a DL assignment. Alternatively, the cross-carrier scheduling PDCCH is an UL grant. Alternatively, the cross-carrier scheduling PDCCH is a CSI request. In an alternate embodiment, the first cell is cross carrier scheduled by a second cell. Alternatively, when a special bandwidth part for a cell is activated, transmission of the cell is switch from self-scheduled to cross-carrier scheduled. Alternatively, the first signal is a MAC control element. Alternatively, the first signal is an activation/deactivation command. Alternatively, the UE receives the first signal when the first cell is activated. Alternatively, when the first cell is activated, an ordinary bandwidth part is active and the first signal is received, the UE does not activate an initial active bandwidth part. Alternatively, when the first cell is activated, an ordinary bandwidth part is active and the first signal is received, the UE ignores the first signal. Alternatively, when the first cell is activated, an ordinary bandwidth part is active and the first signal is received, the UE uses the same active bandwidth part as an active bandwidth part before receiving the first signal. Alternatively, when the first cell is activated, an ordinary bandwidth part is active and the first signal is received, the first signal does not change the active bandwidth part for the cell. Alternatively, when an ordinary bandwidth part is active and the first signal is received, the UE does not activate an initial active bandwidth part. In one embodiment, a bit in the MAC control element associated with the first cell is set to 1. Alternatively, the first signal is a re-activation signal for the first cell.

In another embodiment, when a special bandwidth part for a cell is active, implicit deactivation is not applied to the cell. Alternatively, when an ordinary bandwidth part for the cell is active, implicit deactivation is applied to the cell.

Alternatively, not applying implicit release for the cell can be achieved by setting the value of deactivation timer associated with the cell to infinity when a special bandwidth part for the cell is active. Alternatively, not applying implicit release for the cell can be done by stopping the deactivation timer associated with the cell when a special bandwidth part for the cell is active. Alternatively, not applying implicit release for the cell can be done by disabling implicit deactivation when a special bandwidth part for the cell is active.

Alternatively, applying implicit release for the cell can be done by setting the value of deactivation timer associated with the cell to a configured value when an ordinary bandwidth part for the cell is active. Alternatively, applying implicit release for the cell can be done by not stopping (i.e, continuing) the deactivation timer associated with the cell when an ordinary bandwidth part for the cell is active. Alternatively, applying implicit release for the cell can be done by enabling implicit deactivation when an ordinary bandwidth part for the cell is active.

As those skilled in the art will appreciate, the various disclosed embodiments may be combined to form new embodiments and/or methods.

According to one method, a gNB configures to a UE bandwidth part(s) for a cell. The gNB activates an ordinary bandwidth part for the cell if gNB expect there is some traffic for the cell. The gNB activates a special bandwidth part for the cell if gNB expect there is no traffic for the cell (in a near future).

According to another method, a UE is configured with bandwidth part(s) for a cell. The UE performs a reception for the cell with a bandwidth associated with an ordinary bandwidth part if the ordinary bandwidth part for the cell is active. The UE does not perform reception for the cell if a special bandwidth part for the cell is active.

In one or more of the above-disclosed methods, there is no scheduling for the cell when a special bandwidth part for the cell is active.

In one or more of the above-disclosed methods, the UE turns off the reception component and/or circuit(s), e.g., a RF and/or a baseband for the cell when a special bandwidth part for cell is active.

In one or more of the above-disclosed methods, the special bandwidth part is activated by an activation command for a bandwidth part.

In one or more of the above-disclosed methods, the special bandwidth part is identified by an indication in the activation command.

In one or more of the above-disclosed methods, the special bandwidth part is identified by a bandwidth part configuration.

In one or more of the above-disclosed methods, a bandwidth part having a bandwidth smaller than X PRBs is a special bandwidth part. In another method, X is a smallest bandwidth for a control resource set, e.g., 6 PRBs.

In one or more of the above-disclosed methods, a bandwidth part with bandwidth 0 PRB is a special bandwidth part.

In one or more of the above-disclosed methods, a bandwidth part with a frequency location outside the cell is a special bandwidth part.

In one or more of the above-disclosed methods, a bandwidth part whose resource indication value (RIV) is a reserved value, e.g. All 1's, is a special configuration.

In one or more of the above-disclosed methods, when a special bandwidth part is active, activating an ordinary bandwidth part is done by a first signal.

In one or more of the above-disclosed methods, when an ordinary bandwidth part is active, activating a special bandwidth part is done by a second signal. In another method, when an ordinary bandwidth part is active, activating another ordinary bandwidth part is done by the second signal.

In one or more of the above-disclosed methods, the first signal is transmitted from another cell that is different from the cell.

In one or more of the above-disclosed methods, the second signal is transmitted from the cell.

In one or more of the above-disclosed methods, the first signal is an activation command for a bandwidth part.

In one or more of the above-disclosed methods, the first signal is a PDCCH.

In one or more of the above-disclosed methods, the second signal is a MAC CE.

In one or more of the above-disclosed methods, the second signal is an activation/deactivation command for cell(s).

In one or more of the above-disclosed methods, the second signal is a cross carrier scheduling for the cell.

In one or more of the above-disclosed methods, when a special bandwidth part for the cell is active, the UE behaves as if the serving cell is deactivated.

In one or more of the above-disclosed methods, when a special bandwidth part for the cell is active, the UE does not monitor PDCCH on the cell.

In one or more of the above-disclosed methods, the UE does not implicitly deactivate the cell when a special bandwidth part is activated for the cell.

In one or more of the above-disclosed methods, the UE can implicitly deactivate the cell when an ordinary bandwidth part is activated for the cell.

Figure 8:
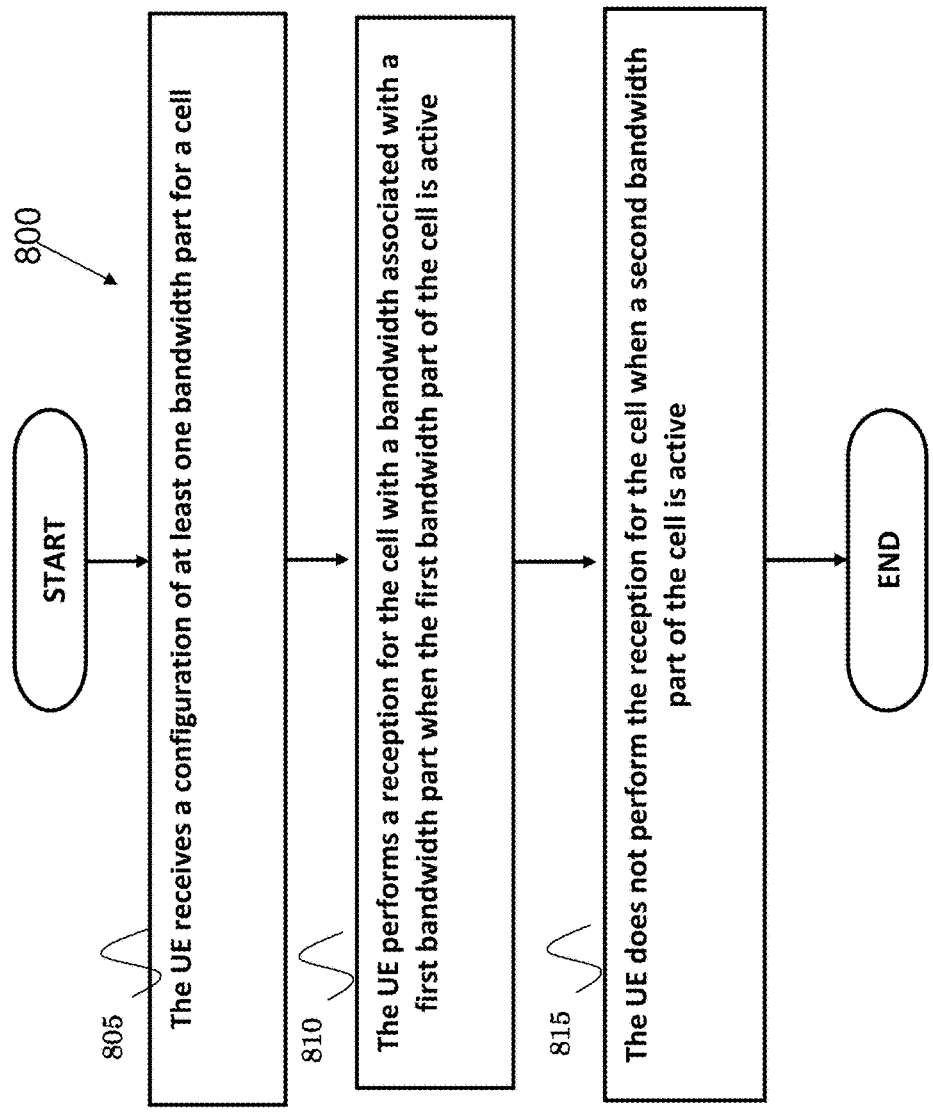
FIG. 8 illustrates a flow chart of one exemplary embodiment.

FIG. 8 is a flow chart 800 according to one exemplary embodiment from the perspective of a UE. In step 805, the UE receives a configuration of at least one bandwidth part for a cell. In step 810, the UE performs a reception for the cell with a bandwidth associated with a first bandwidth part when a first bandwidth part of the cell is active. In step 815, the UE does not perform the reception for the cell when a second bandwidth part of the cell is active.

In one or more of the above-disclosed methods, the UE behaves as if the cell is deactivated when the second bandwidth part is active.

According to another exemplary method, the UE turns off a reception circuit or a component of the cell when the second bandwidth part is active.

In one or more of the above-disclosed methods, the second bandwidth part is identified by an indication in an activation command for the bandwidth part.

In one or more of the above-disclosed methods, the second bandwidth part is identified by a bandwidth part configuration.

In one or more of the above-disclosed methods, the second bandwidth part is a bandwidth part with zero bandwidth.

In one or more of the above-disclosed methods, the first bandwidth part and the second bandwidth part are activated with different signals.

In one or more of the above-disclosed methods, when the second bandwidth part is active, an activation command for a third bandwidth part of the cell is received in a second cell. The third bandwidth part could be the first bandwidth part. In one embodiment, the second cell is different from the cell.

In one or more of the above-disclosed methods, when the first bandwidth part is active, an activation command for a fourth bandwidth part of the cell is received in the cell. The fourth bandwidth part could be the second bandwidth part.

In one or more of the above-disclosed methods, when the second bandwidth part is active, the UE resumes reception for an activation command for a third bandwidth part of the cell in configured monitoring occasions. The third bandwidth part could be the first bandwidth part.

Figure 9:
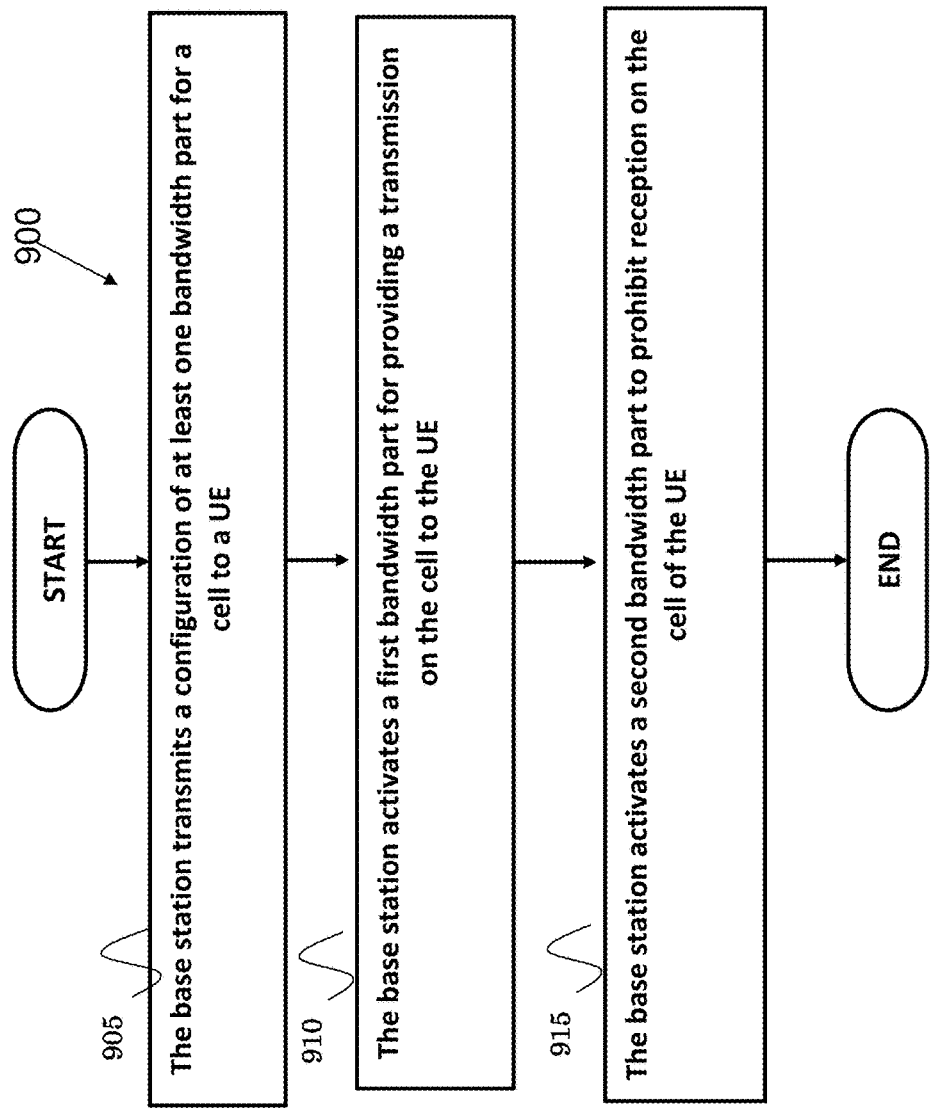
FIG. 9 illustrates a flow chart of one exemplary embodiment.

FIG. 9 is a flow chart 900 according to one exemplary embodiment from the perspective of a base station. In step 905, the base station transmits a configuration of at least one bandwidth part for a cell to a UE. In step 910, the base station activates a first bandwidth part for providing a transmission on the cell to the UE. In step 915, the base station activates a second bandwidth part to prohibit reception on the cell of the UE.

According to another exemplary method, the base station does not schedule data to the UE when the second bandwidth part is active.

According to another exemplary method, the base station activates the second bandwidth part to inform the UE to turn off a reception circuit or a component.

In one or more of the above-disclosed methods, the second bandwidth part is identified by an indication in an activation command for a bandwidth part.

In one or more of the above-disclosed methods, the second bandwidth part is identified by a bandwidth part configuration.

In one or more of the above-disclosed methods, the second bandwidth part is a bandwidth part with zero bandwidth.

In one or more of the above-disclosed methods, the first bandwidth part and the second bandwidth part are activated with different signals.

According to another exemplary method, the base station transmits an activation command for a third bandwidth part of the cell in a second cell when the second bandwidth part is active. The third bandwidth part could be the first bandwidth part. In one embodiment, the second cell is different from the cell.

According to another exemplary method, the base station transmits an activation command for a fourth bandwidth part of the cell is received in the cell when the first bandwidth part is active. The fourth bandwidth part could be the second bandwidth part.

According to another exemplary method, the base station transmits activation command for a third bandwidth part of the cell in configured monitoring occasions when the second bandwidth part is active. The third bandwidth part could be the first bandwidth part.

Referring back to FIGS. 3 and 4, in one embodiment, the device 300 includes a program code 312 stored in memory 310. The CPU 308 could execute program code 312 to enable the network (i) to receive a configuration of at least one bandwidth part for a cell; (ii) to perform a reception for the cell with a bandwidth associated with a first bandwidth part if a first bandwidth part of the cell is active; and (iii) to not perform the reception for the cell if a second bandwidth part of the cell is active.

In another embodiment, from the perspective of a base station, the device 300 includes a program code 312 stored in memory 310. The CPU 308 could execute program code 312 to enable the network (i) to transmit a configuration of at least one bandwidth part for a cell to a UE; (ii) to activate a first bandwidth part for providing a transmission on the cell to the UE; and (iii) to activate a second bandwidth part to prohibit reception on the cell of the UE.

Furthermore, the CPU 308 can execute the program code 312 to perform all of the above-described actions and steps or others methods described herein.

Based on above-disclosed methods and apparatuses, both power saving and quick traffic adaptation can be achieved by designing a special bandwidth part. Additionally, the above-disclosed methods and apparatuses also provide stronger power saving techniques for a PCell since deactivating a PCell is not possible.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for operation of a user equipment (UE), the method comprising:
receiving by the UE a designation of at least a first bandwidth part and a second bandwidth part of a cell, wherein the second bandwidth part is different from the first bandwidth part;
performing by the UE Physical Downlink Control Channel (PDCCH) monitoring for the cell with the first bandwidth part when the first bandwidth part is active; and
not performing by the UE PDCCH monitoring for the cell during any time period that the second bandwidth part is active.

2. The method of claim 1, wherein the second bandwidth part is designated by an indication in an activation command for the bandwidth part.

3. The method of claim 1, wherein the second bandwidth part is designated by a bandwidth part configuration.

4. The method of claim 1, wherein the second bandwidth part is a bandwidth part with zero bandwidth.

5. The method of claim 1, wherein the first bandwidth part and the second bandwidth part are each activated with different signals.

6. The method of claim 1, wherein an activation command for a third bandwidth part of the cell is received in a second cell when the second bandwidth part is active.

7. The method of claim 6, wherein an activation command for a fourth bandwidth part of the cell is received in the cell when the first bandwidth part is active.

8. The method of claim 1, further comprising not performing UL transmission for the cell when the second bandwidth part is active.

9. The method of claim 1, further comprising reporting CSI (Channel State Information) for the cell during any time period that the second bandwidth part is active.

10. The method of claim 1, wherein there is no scheduling for the cell during any period that the second bandwidth part is active.

11. The method of claim 1, wherein the UE reports Channel State Information (CSI) for the cell when the second bandwidth part is active.

12. The method of claim 1, wherein the UE performs radio resource management measurement for the cell or radio link monitoring for the cell when the second bandwidth part is active.

13. A method of operation of a base station, the method comprising:
   transmitting by the base station a designation of at least a first bandwidth part and a second bandwidth part of a cell to a UE, wherein the second bandwidth part is different from the first bandwidth part;
   activating by the base station the first bandwidth part of the cell to provide a transmission on the cell to the UE; and
   activating by the base station the second bandwidth part of the cell to prohibit PDCCH monitoring on the cell by the UE during an entire period that the second bandwidth part is active.

14. The method of claim 13, further comprising the base station not scheduling data to the UE when the second bandwidth part is active.

15. The method of claim 13, wherein the second bandwidth part is designated by an indication in an activation command.

16. The method of claim 13, wherein the second bandwidth part is designated by a bandwidth part configuration.

17. The method of claim 13, wherein the second bandwidth part is a bandwidth part with zero bandwidth.

18. The method of claim 13, wherein the first bandwidth part and the second bandwidth part are each activated with different signals.

19. The method of claim 13, wherein the base station transmits an activation command for a third bandwidth part of the cell in a second cell when the second bandwidth part is active.

20. A method for operation of a wireless network, the wireless network comprising a user equipment (UE) and a base station (BS), the method comprising:
   transmitting by the base station a designation of a first bandwidth part of a cell to the UE;
   transmitting by the base station a second bandwidth part of the cell to the UE that is different than the first bandwidth part;
   activating by the base station the first bandwidth part of the cell to provide a transmission on the cell to the UE;
   performing by the UE Physical Downlink Control Channel (PDCCH) monitoring for the cell with the first bandwidth part when the first bandwidth part is active;
   activating by the base station the second bandwidth part of the cell; and
   not performing by the UE PDCCH monitoring for the cell during any time period that the second bandwidth part is active.

* * * * *